Dec. 13, 1960   F. J. CARSON   2,963,822
GLASS BENDING MOLD
Filed Jan. 2, 1958   2 Sheets-Sheet 1
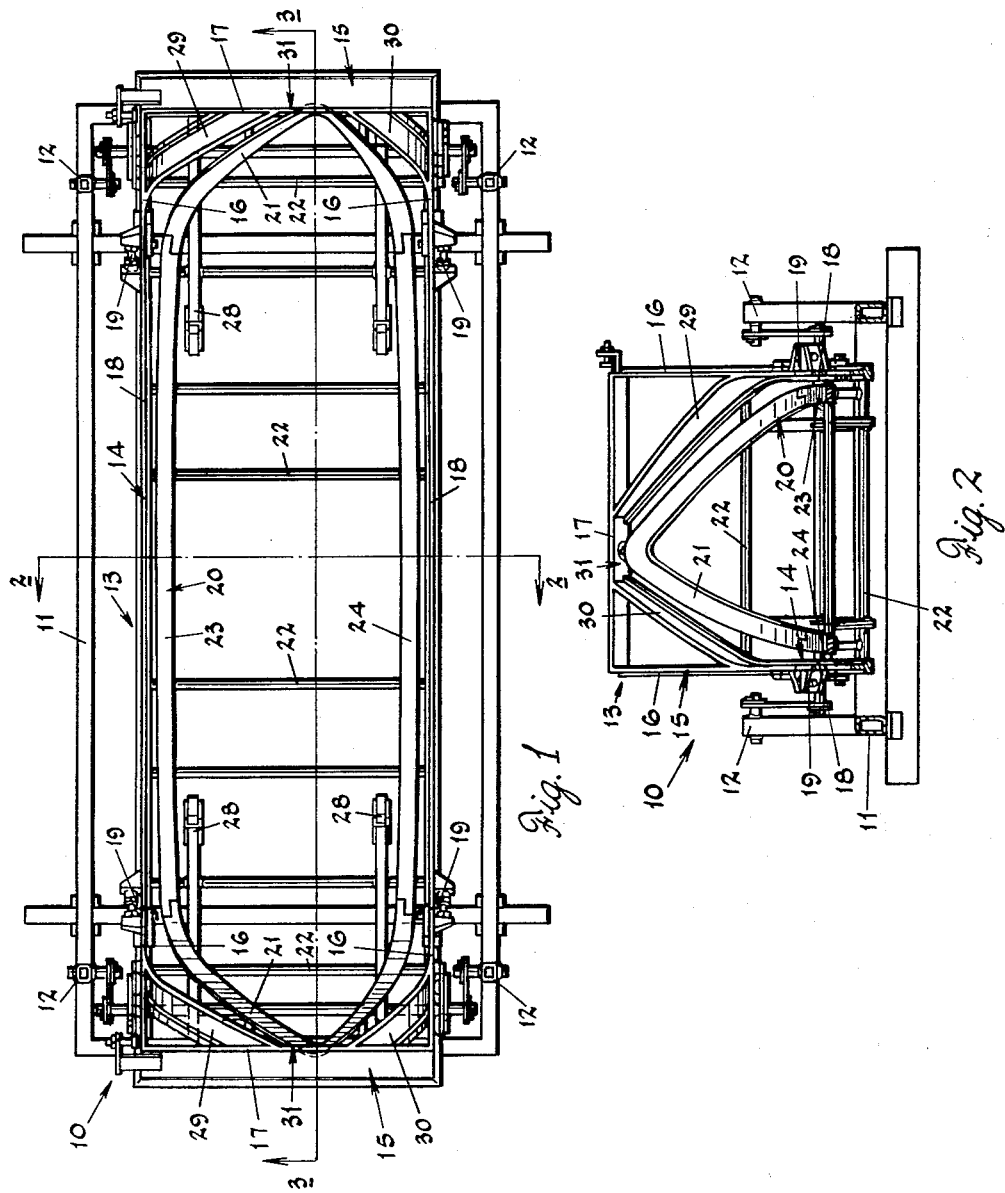
INVENTOR.
Frank J. Carson
BY
Nobbe & Swope
ATTORNEYS Dec. 13, 1960 F. J. CARSON 2,963,822
GLASS BENDING MOLD Filed Jan. 2, 1958 2 Sheets-Sheet 2

INVENTOR.
Frank J. Carson
BY
Nobbe & Swope
ATTORNEYS

United States Patent Office 2,963,822
Patented Dec. 13, 1960

2,963,822
GLASS BENDING MOLD

Frank J. Carson, Toledo, Ohio, assignor to Libbey-Owens-Ford Glass Company, Toledo, Ohio, a corporation of Ohio Filed Jan. 2, 1958, Ser. No. 706,752
3 Claims. (Cl. 49—67)

The present invention relates generally to apparatus for bending glass sheets or plates, and more particularly to an improved bending mold.

In the bending of glass sheets to form bent sheets having their peripheral edges in compression, thus providing a more shock resistant sheet, there have been two generally accepted types of bending molds used. One of these upon which a pattern cut sheet is bent has a shaping rail or surface of such a size that when the glass sheet is bent into conformity therewith the marginal periphery of the sheet overhangs the rail and therefore cools without being materially affected by the residual heat within the rail and thus sets in compression.

In the other type of mold, which is used for bending blank size glass sheets which are cut to pattern outline after being bent, the shaping rail is substantially rectangular in plan view and a heat retaining member having its periphery contoured to the desired outline for the pattern cut sheet, but somewhat smaller as compared thereto, is located within the rectangular shaping rail and spaced downwardly therefrom. After the glass sheet is bent into contact with the rail during bending, and while the mold is passing through the furnace annealing zone, the residual heat within the heat retaining member prevents the portion of the sheet thereabove from cooling at the same rate as intermediate portions of the sheet outwardly therefrom between the periphery of the member and the shaping rail which causes the intermediate sheet portions to set in compression. In cutting a sheet bent in such a manner to form a patterned sheet, the scoring tool is moved along a path slightly outwardly of the heat retaining member so that the resultant pattern cut sheet will have its peripheral edge in compression.

In molds of the last mentioned type, an undesirable cross bend in the sheet extremities occasionally develops when the block size sheet is very wide and yet the pattern cut sheet is to have relatively narrow tapered ends since there is nothing to support the sheet between opposed longitudinal sections of the shaping rail. In accordance with the present invention, however, this undesirable feature is eliminated and at the same time a more sharply defined stress pattern is created in the bent sheet.

It is therefore an important object of the present invention to provide an improved bending mold for bending glass sheets.

Another object of the invention is to provide an improved bending mold for bending a blank size glass sheet to form a pattern cut sheet having relatively sharply defined stress areas therein.

Another object of the invention is to provide an improved bending mold which substantially eliminates undesirable cross bending in the end portions of a relatively wide blank glass sheet which is to be subsequently cut to form a bent patterned glass sheet having relatively sharply tapered end sections.

Other objects and advantages of the invention will become more apparent during the course of the following description when taken in connection with the accompanying drawings.

In the drawings wherein like numerals are employed to designate like parts throughout the same:

Fig. 1 is a plan view of an improved bending mold constructed in accordance with the present invention;

Fig. 2 is a transverse sectional view taken along line 2—2 of Fig. 1; and

Figure 3:
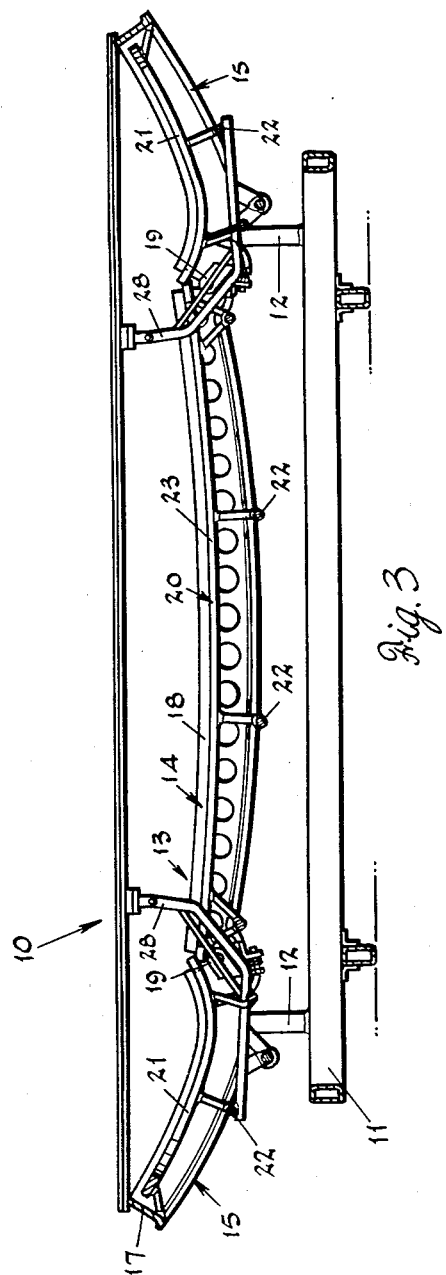
Fig. 3 is a longitudinal section view taken along the line 3—3 of Fig. 1 and showing the mold in the open position.

With reference now to the drawings and particularly to Fig. 1, there is shown in plan view the improved glass bending apparatus 10 of the present invention. The apparatus 10 comprises a conventional rectangular rack or frame 11 having support posts 12 extending upwardly from each of the four corners thereof for supporting the mold proper 13 above the frame.

The mold 13 is of alloyed steel construction and comprises a central section 14 and a pair of oppositely disposed movably mounted end sections 15 disposed immediately adjacent the opposite ends of the center section 14 and forming substantially continuations thereof.

Each of the mold end sections comprises a pair of relatively straight side shaping rails 16 having a relatively sharp curvature connected to one another of their outermost ends by a flat, straight transversely disposed end shaping rail 17. The central mold section 14 comprises a pair of spaced, straight shaping rails 18 having a relatively shallow curvature and aligned with the side rails 16 of the movably mounted mold end sections and connected thereto by conventional hinges 19. With such a construction, the respective rail sections form a substantially continuous shaping rail having an outline conforming to the marginal periphery of the blank size sheet to be bent.

Carried within the confines of the respective mold sections and disposed below the upper surface of the respective shaping rail sections is a metallic strain bar 20 of limited width preferably formed of a black iron and comprising triangular or substantially V-shaped end portions 21 secured to the mold end sections by means of transverse rods 22 secured to the side rails 16, and a central section comprising spaced portions 23 and 24 secured to the central rail sections 18 by means of additional transverse rods 22 which rods also serve to maintain the respective rail sections rigid. As shown in Fig. 1, the opposite ends of the bar portions 23 and 24 and the adjacent ends of the bar portions 21 have complementary notches formed therein and thus interfit with one another to form a substantially continuous structure.

The mold central and end sections are conventionally supported for movement from an open to a closed position by means of transverse rods secured to the undersurface of the rails 16 of the mold end sections and extending outwardly therefrom to have their ends rotatably received in the lowermost ends of links having their uppermost ends rotatably supported upon pins secured to the support posts 12. Such a construction is commonly used and supports the mold sections for movement from an open position, wherein a flat glass sheet is received prior to bending, to a closed position during bending of the sheet.

To support the glass sheet or pair of sheets intermediate the ends thereof, a pair of sheet engaging arms 28 are secured to the transverse rods 25. These arms are of the type disclosed in U.S. Patent No. 2,814,164 to which reference may be had for a more complete understanding of their function.

It was previously brought out that when blank size sheets of greater than usual width are bent and ultimately cut to form patterned sheets having relatively sharply tapered end portions, it is possible that an undesirable cross bend will develop across the sheet in the tapered end portions. To overcome this difficulty, and at the same time accentuate the strain pattern in the sheet, tapered auxiliary shaping rail sections 29 and 30 are disposed in the corners of each of the mold end sections inwardly of the rails 16 and 17, and have their upper surfaces contoured somewhat similarly to the rails 16 so that they lie in substantially the same curved plane. As best shown in Fig. 2, each of the rail sections 29 and 30 have their outermost ends slightly spaced from one another and joined to the transverse rail section 17 in spaced apart relationship. The innermost ends of each of the rail sections 29 and 30 are secured to the side rail sections 16 of the mold end sections slightly outwardly of their innermost ends. As viewed in Fig. 1, the rail sections 29 and 30 are tapered to a substantially identical configuration as that displayed by the V-shaped end portions 21 of the bar 20 carried by each of the mold end sections but are spaced outwardly therefrom and thus form, with a portion 31 of the rail 17, a substantially triangular or V-shaped rail section surrounding and spaced outwardly from the substantially V-shaped strain bar sections 21.

When a glass sheet is bent into conformity with the novel mold of the invention, excessive cross bending of the sheet in the end portions thereof is prevented by the rail sections 29 and 30. During the annealing of the glass sheet, which takes place immediately after bending, the residual heat remaining within the bar section 21 and the curved rail sections 29 and 30 causes the portions of the glass sheet immediately thereabove to cool at a decreased rate as compared to the intermediate portions of the sheet therebetween thus causing this intermediate portion to set in compression. The same differential cooling of the sheet also takes place between the side rail sections 18 of the central mold section and the central portions 23 and 24 of the strain bar 20 so that a closed band of compression is formed in the glass sheet which substantially corresponds to the desired peripheral outline of the patterned sheet to be cut therefrom. Therefore, when the bent sheet is removed from the mold it is only necessary to score the sheet through the area of compression to produce a patterned bent sheet having its peripheral edge in compression.

From the foregoing description, it will be seen that a bending mold constructed in accordance with the present invention not only prevents cross bending at the extremities of the sheet but also sharply accentuates and localizes the stress pattern formed in the sheet thus producing a sheet having superior resistance to edge breakage or fracture.

It is to be understood that the form of the invention herewith shown and described is to be taken as a preferred embodiment of the same, and that various changes may be resorted to without departing from the spirit of the invention or the scope of the subjoined claims.

I claim:

1. In apparatus for bending blank size glass sheets and preventing cross bending in the end portions of the sheets, a bending mold comprising a substantially continuous shaping rail having a sheet engaging surface that substantially conforms in elevation and outline to the configuration of a bent blank size glass sheet, a heat retaining member at each end of said mold spaced inwardly from the shaping rail and downwardly from said sheet engaging surface of said shaping rail, and an auxiliary shaping rail disposed within said substantially continuous shaping rail and outwardly of the periphery of said heat retaining member, said auxiliary shaping rail having a sheet engaging surface that substantially conforms in elevation and outline to the configuration of the end portion of a bent pattern cut glass sheet.

2. In apparatus for bending blank size glass sheets, and preventing cross bending in the end portions of the sheets, a bending mold comprising a plurality of mold sections including a movably mounted end section, said end section comprising a pair of spaced side shaping rails and an end rail connecting the outermost ends of said side rails, a substantially triangularly shaped heat retaining member located within the confines of said side and end rails, and an angularly disposed auxiliary shaping rail extending along opposed sides of said triangularly shaped heat retaining member in each of the corners of said end section defined by the intersection of the end rail with each side shaping rail, each of said auxiliary shaping rails having its outermost end secured to a central portion of the end rail and its innermost end secured to the side shaping rail slightly outwardly of the innermost end of said side rail.

3. In apparatus for bending blank size glass sheets and preventing cross bending of the end portions of the sheets as claimed in claim 2, wherein the outermost ends of the auxiliary shaping rails are slightly spaced from one another and join the end rail in spaced apart relationship.

References Cited in the file of this patent

UNITED STATES PATENTS

| | | |
|---|---|---|
| 2,330,349 | Galey | Sept. 28, 1943 |
| 2,348,278 | Boyles et al. | May 9, 1944 |
| 2,683,334 | Rugg et al. | July 13, 1954 |
| 2,688,210 | Jendrisak | Sept. 7, 1954 |
| 2,720,729 | Rugg | Oct. 18, 1955 |

FOREIGN PATENTS

| | | |
|---|---|---|
| 201,078 | Australia | Feb. 22, 1956 |
| 203,334 | Australia | Sept. 21, 1956 |
| 1,128,600 | France | Oct. 27, 1956 |